June 22, 1948.　　　　　C. H. SAUER　　　　　2,443,804
TRACTOR COUPLING MEANS FOR PREVENTING UPWARD MOVEMENT
OF THE TRACTOR POWER PLANT AND FRONT END
Filed Jan. 19, 1945
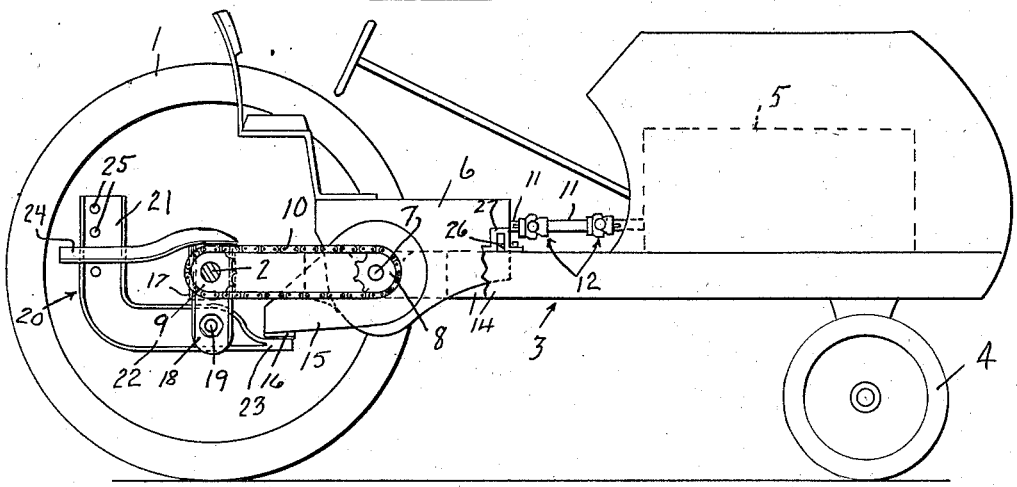
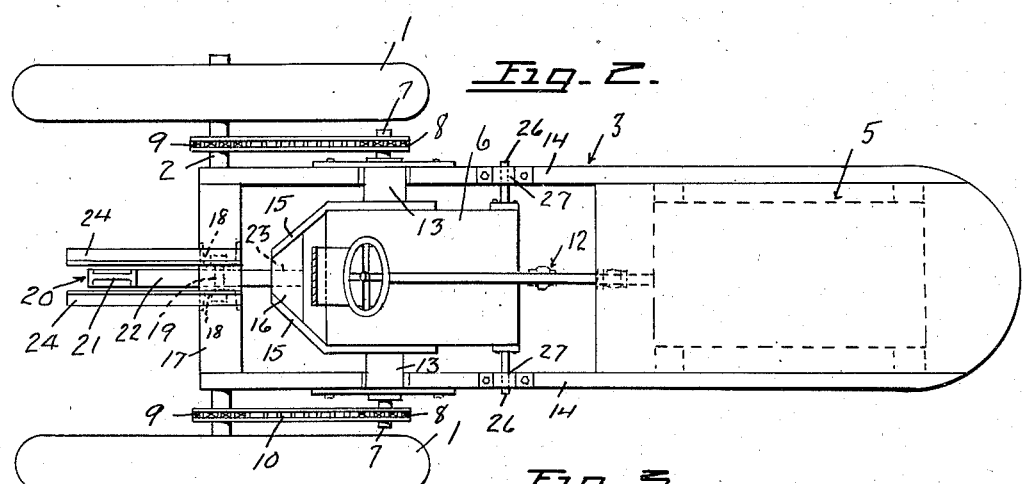
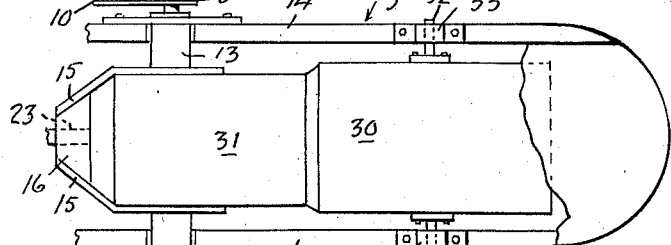
INVENTOR.
CHRISTIAN H. SAUER.
BY
Boykin, Mohler & Beckler
ATTORNEYS.

Patented June 22, 1948

2,443,804

UNITED STATES PATENT OFFICE 2,443,804

TRACTOR COUPLING MEANS FOR PREVENTING UPWARD MOVEMENT OF THE TRACTOR POWER PLANT AND FRONT END

Christian H. Sauer, Chico, Calif.

Application January 19, 1945, Serial No. 573,574

4 Claims. (Cl. 180—82)

This invention relates to a tractor coupling and has for one of its objects the provision of means for increasing the adhesive or rolling friction of the wheels of a tractor on the ground or tracks when such tractor is coupled to a load for pulling or pushing the same.

Another object of the invention is the provision of an improved coupling system for a tractor that will facilitate steering and operating of such tractor when the same is connected with a load for moving the latter, and a still further object is the provision of a coupling system in a tractor that will enable the tractor to pull, with safety, greater load than conventional tractors of a corresponding type that are heavier and of greater horsepower.

A simple example of a tractor is the farm tractor that is primarily intended to pull a load, or if properly equipped, to push a load. This type of tractor is used by way of illustration of the invention herein disclosed.

Heretofore the principal method of increasing the traction of a tractor is by adding weight. Tires are filled or partially filled with water. Dead weights are added where it is thought they will do the most good, generally on the front to hold down the front end. Obviously such added weight must be moved by the engine in addition to its pulling a load, thus adding to the cost of operating the tractor without a corresponding increase in pay load, or the load being pulled.

With my invention there is no addition of weight to the tractor and yet the traction is greatly increased. The front end of the tractor (where it is a rear wheel drive in particular) is held down during pulling of a load that would otherwise either cause the tractor to upset rearwardly or cause the front wheels to lose most, if not all, of their traction, thereby preventing effective steering. This increase in driving traction enables the use of a small tractor where a larger one had previously been required.

Other objects and advantages will appear in the drawings and in the description.

In the drawings, Fig. 1 is a part sectional, part elevational view of a tractor illustrating one form of the invention.

Fig. 2 is a plan view of the tractor of Fig. 1, with the driver's seat removed for clarity.

Fig. 3 is a fragmentary plan view of a tractor illustrating another form of the invention than that shown in Figs. 1, 2.

In detail, the tractor illustrated in the drawings comprises a pair of rear wheels 1 on an axle 2 that supports the rear end of a frame 3. One or more front steering wheels 4 (only the near one seen in Fig. 1) support the front end of the tractor.

A motor 5 is rigidly secured on said frame, said motor being connected with a transmission and differential enclosed in a housing 6, the axle shafts 7 from the differential carrying sprockets 8 at their opposite outer ends respectively, which sprockets are connected with sprockets 9 on axle 2 by chains 10 for driving the rear wheels.

In the form shown in Figs. 1, 2 a drive shaft 11 connecting the transmission with the engine is provided with one or more universal or flexible joints 12, one of which may be splined to the drive shaft to permit slight axial movement of the shaft without causing strain.

The housing 6 is pivoted in bearings 13 carried by the side frame members 14 of frame 3, which bearings are coaxial with the shafts 7. Thus the transmission and differential housing is free to revolve on the axis of shafts 7, except for drive shaft 11. However, slight rotary movement is permitted by the universal joints 12, one of which is connected with the shaft by a conventional spline.

Rigidly secured to opposite sides of housing 6 are arms 15 that extend rearwardly from said housing and convergently. A plate 16 may connect their rear adjacent ends, said plate being preferably on the undersides of the arms.

The rear ends of side frame members 14 are connected by a rear end member 17 that may be in the form of an inverted channel strip enclosing the rear axle 2.

Depending from said member 16 intermediate its ends is a pair of opposed bracket arms 18 that carry a horizontal shaft or pivot 19 adjacent their lower ends. These bracket arms are rigidly secured to said end member by any suitable means, such as by welding.

A generally L-shaped drawbar 20 having one leg 21 extending upwardly and the other leg 22 extending horizontally is pivotally secured on shaft 19, the said shaft extending through the outer end portion of the horizontal leg 22. An extension 23 of said leg extends under the plate 16 and the vertically extending leg 21 is spaced a substantial distance rearwardly of the end frame member 17 and is swingable between a pair of rearwardly extending guide members 24 that are secured at their forward ends to the rear frame member 17.

The leg 21 of the drawbar 20 is formed with a vertical row of perforations 25 for connecting the said leg with the load to be pulled.

At opposite sides of the forward end of the housing 6 are a pair of oppositely outwardly extending axially aligned pins or projections 26 that are rigidly secured to said housing at their inner ends. These pins overlie the side frame members 14 and are vertically movable between the legs of inverted U-shaped members 27 respectively secured on said frame members. Thus the swinging movement of the forward end of housing 6 is limited by the frame members and by the closed ends of said U-shaped members 27. When the tractor is not pulling a load, the pins support the forward end of housing 6 on said frame members 14.

The principal difference between the invention of Figs. 1 and 2 and that of Fig. 3 is that in the latter figure the engine 30 and transmission and rear end housing 31 are rigidly secured together for swinging on the bearings 13 that support housing 31 on frame members 14.

Instead of the pins 26 being carried on the housing 31, similar pins or projections 32 may be secured to engine 30 for movement in inverted U-shaped members 23 that are secured on frame members 14 and that are identical with the members 27.

In operation upon a load, such as a gang of plows, trailer, etc. being connected with the leg 21 of the drawbar, and upon the tractor engine being connected with the rear wheels for driving them, a flexible coupling between the load and the engine is effected in which the tendency of the housing 6 and forward end of the tractor to move upwardly about the axes of shafts 7 and axle 2 respectively, is overcome and positively reversed by the load connected with leg 21. This flexible coupling is the engagement between the projection 23 on the leg 22 and the plate 16 on housing 6. In the event the load becomes too great, the housing will not rotate on the axis of shafts 7 so as to move the forward end thereof upwardly. The same is true in Fig. 3 except that the engine or motor 30 constitutes an increased weight over the forward end of housing 6 itself. The tendency of the housing 6 to rotate rearwardly constantly exerts a downward pressure on the leg 22 that is carried by the rear frame member 17 and rear axle 2, while the pull on leg 21 constantly tends to force the forward end of the tractor downwardly so long as the upward force applied against plate 16 exceeds the tendency of said plate to move down.

The tractors illustrated herein are conventional in every respect with the exception of the flexible connection above described and the arrangement providing for such connection. With the invention as described, the tractors were found to be capable of pulling over double the maximum previous load before the application of the invention under identically the same circumstances and without slipping the tires or using water in the rear tires as recommended in conventional tractors for increasing traction and stabilizing the tractor.

It is obvious that the invention is applicable to practically any type of power driven tractor or vehicle, although certain modifications may be required to fit certain structural peculiarities. The shape of drawbar 20 may be changed and the shape and positions of other elements may be modified to meet different conditions. Also a gear drive instead of chain drive may be employed. In other words, the drawings and description are not to be considered restrictive of the invention, but merely illustrative thereof.

I claim:

1. In a tractor having traction wheels and power means connected therewith for driving said wheels, a drawbar, a pivot securing said drawbar to said tractor for upward swinging of one end thereof at one side of said pivot upon its opposite end being connected with a load separate from the tractor for movement of such load upon driving said wheels, movable means connected with said power means and rotatable about a horizontal axis forwardly of the axis of said rear wheels and having portions projecting rearwardly and forwardly of said horizontal axis, said means being responsive to predetermined tractive resistance to the drive of said wheels for effecting downward movement of said rearwardly projecting portion of said means against said one end of said drawbar, means supporting said movable means on said tractor for said movement, said traction wheels being the rear wheels of said tractor, and the engagement between said one end of said drawbar and said movable means being between the front end of said tractor and said traction wheels.

2. In a tractor having traction wheels and a motor for driving said wheels, means providing a driving connection between said motor and said wheels including a member movable downwardly under power from said motor upon predetermined tractive resistance to the drive of said wheels, said motor being forwardly of said member, a coupling on said tractor for connecting it with a load to be moved, said coupling including an element movable upwardly with a force directly proportional to the strain on said coupling for moving said load, means mounting said element for said movement and positioning said element for engagements with said member for resisting said downward movement of the latter, said first mentioned means including a housing enclosing a transmission mechanism driven by said motor, means pivotally supporting said housing for revolving about a horizontal axis forwardly of the axis of said wheels, and said member being secured to said housing, the said housing including a portion projecting forwardly thereof from said last mentioned means tending to move upwardly upon downward movement of said member whereby said upward movement of said element will resist the said upward movement of said portion.

3. In a tractor having traction wheels and a motor for driving said wheels, means providing a driving connection between said motor and said wheels including a member movable downwardly under power from said motor upon predetermined tractive resistance to the drive of said wheels, a coupling on said tractor for connecting it with a load to be moved, said coupling including an element movable upwardly with a force directly proportional to the strain on said coupling for moving said load, means mounting said element for said movement and positioning said element for engagements with said member for resisting said downward movement of the latter, said first mentioned means including a housing enclosing a transmission mechanism driven by said motor, said housing being rigidly secured to said motor, and means pivotally supporting said housing and motor for swinging on a horizontal axis extending transversely of said tractor, said member being secured to said housing for movement therewith, the said housing including a portion projecting forwardly thereof from said last mentioned means tending to move upwardly upon downward movement of said member whereby said upward movement of said element will resist the said upward movement of said portion.

4. In a tractor having traction wheels and power means connected therewith for driving said wheels, a drawbar, a pivot securing said drawbar to said tractor for upward swinging of one end thereof at one side of said pivot, its opposite end being connected with a load separate from the tractor for movement of such load upon driving said wheels, movable means connected with said power means responsive to predetermined tractive resistance to said traction wheels for downward movement of a portion thereof about a horizontal axis against said one end of said drawbar, means supporting said movable means on said tractor for said movement about said horizontal axis being forwardly of the axis of said wheels, said traction wheels being the rear wheels of said tractor, the point of engagement between said movable means and said one end of said drawbar being ahead of the axis of rotation of said wheels, and said power means being ahead of said horizontal axis.

CHRISTIAN H. SAUER.

REFERENCES CITED

The following references are of record in the file of this patent:

UNITED STATES PATENTS

| Number | Name | Date |
|---|---|---|
| 1,378,954 | Heylman | May 24, 1921 |
| 1,462,685 | Counter | July 24, 1923 |
| 1,601,878 | Olson | Oct. 5, 1926 |
| 2,233,318 | Lewis et al. | Feb. 25, 1941 |